United States Patent [19]

Gray

[11] 4,134,049

[45] Jan. 9, 1979

[54] CIRCUIT FOR CONTROLLING SLOW SPEED OF STACKER ELEVATOR MOTOR

[75] Inventor: Robert B. Gray, Elmira, N.Y.

[73] Assignee: Hartman Metal Fabricators, Inc., Victor, N.Y.

[21] Appl. No.: 776,654

[22] Filed: Mar. 11, 1977

[51] Int. Cl.² ............................................. H02P 1/42
[52] U.S. Cl. .................................... 318/756; 318/480
[58] Field of Search ............ 318/207 R, 207 J, 207 K, 318/480

[56] References Cited

U.S. PATENT DOCUMENTS

| 3,181,046 | 4/1965  | Sutton        | 318/207 X |
| 3,586,020 | 11/1968 | Lisi          | 318/207 R |
| 3,593,079 | 7/1971  | Plant         | 318/207 R |
| 3,678,355 | 7/1972  | Bucek et al.  | 318/207 X |
| 3,921,048 | 11/1975 | Padgitt       | 318/480   |
| 4,034,275 | 7/1977  | Mange         | 318/480 X |

Primary Examiner—Gene Z. Rubinson

Attorney, Agent, or Firm—Shlesinger, Fitzsimmons & Shlesinger

[57] ABSTRACT

When a stacker motor slows down before stopping or reversing, it generates an error signal the polarity of which is detected by a sensing circuit which is optically coupled to a motor reversing circuit. If the detected error signal is positive, a first set of LED's in the sensing circuit are illuminated and trigger associated photo-sensitive transistors in the reversing circuit, which in turn energize selected pairs of back-to-back SCR's to connect the lines of a polyphase power source in a "forward" drive direction to the windings of the stacker motor in question, so that the motor is driven in a forward direction. When the error signal is negative, different LED's in the sensing circuit are illuminated and energize different transistors in the reversing circuit so that the motor is driven in the opposite or reverse direction. Inhibiting devices are employed in the reversing circuit to prevent undesirable shorting out of lines upon sudden motor reversal.

10 Claims, 4 Drawing Figures

CIRCUIT FOR CONTROLLING SLOW SPEED OF STACKER ELEVATOR MOTOR

This invention relates to controls for an electric motor, and more particularly for an improved circuit for controlling the slow speed operation of a three phase reversible electric motor of the type which is used to drive the elevator section of an automatic stacker, or the like.

One of the major problems in controlling the operation of an automatic stacker, for example a stacker of the type disclosed in U.S. Pat. No. 3,790,006, is the difficulty in controlling the trolley and elevator sections of the stacker accurately to position the trolley section in a desired horizontal position, and the elevator section in a desired vertical position. For example, during the movement of the elevator section from one vertical location to another, its motor is designed initially to move the elevator rapidly toward a predetermined vertical position on the stacker mast, then smoothly to slow it down as it approaches the desired elevation, and then to move the section very slowly to the precise vertical position that is desired.

Likewise it is customary to drive the trolley section of the stacker, first rapidly toward a desired horizontal position, and then smoothly to slow it down as it approaches the desired horizontal position. Final movements of the trolley section of the stacker are also made during slow operation of the associated drive motor.

Because of the extremely heavy loads involved in moving the trolley and elevator sections of the stacker, it is customary to employ a rather powerful, reversible, three phase electric motor for driving each section. Moreover, because of the inertia forces normally developed during the movements of these sections, it is very difficult to control the slowing down and stopping of the respective sections exactly at the desired positions. To control these operations it has been customary, for example in the case of the stacker shown in U.S. Pat. No. 3,790,006, to employ a series of SCR's, which are connected in back-to-back pairs to control current flow in the three windings of the reversible elevator motor during its "slow speed" operation.

A major problem heretofore encountered in reversing a motor of the type described is that occasional gating of some or all of the reverse drive set of SCR's, at a time when the forward driving set is conducting, frequently results in damage to the control circuits. If for some reason both the reverse and the forward driving sets of SCR's are accidentally simultaneously gated, two input lines to the motor will be shorted. This necessitates designing the circuits so that appropriate fuses blow and interrupt the circuit before any of the SCR's are damaged.

It is an object of this invention, therefore, to provide an improved solid state switching circuit for controlling the direction and speed of rotation of a polyphase motor of the type described.

A further object of this invention is to provide improved control circuits which will satisfactorily prohibit any undesirable cross gating of the forward and reverse sets of SCR's which control the operation of a motor of the type described.

Other objects of the invention will be apparent hereinafter from the specification and from the recital of the appended claims, particularly when read in conjuction with the accompanying drawings.

Figure 1:
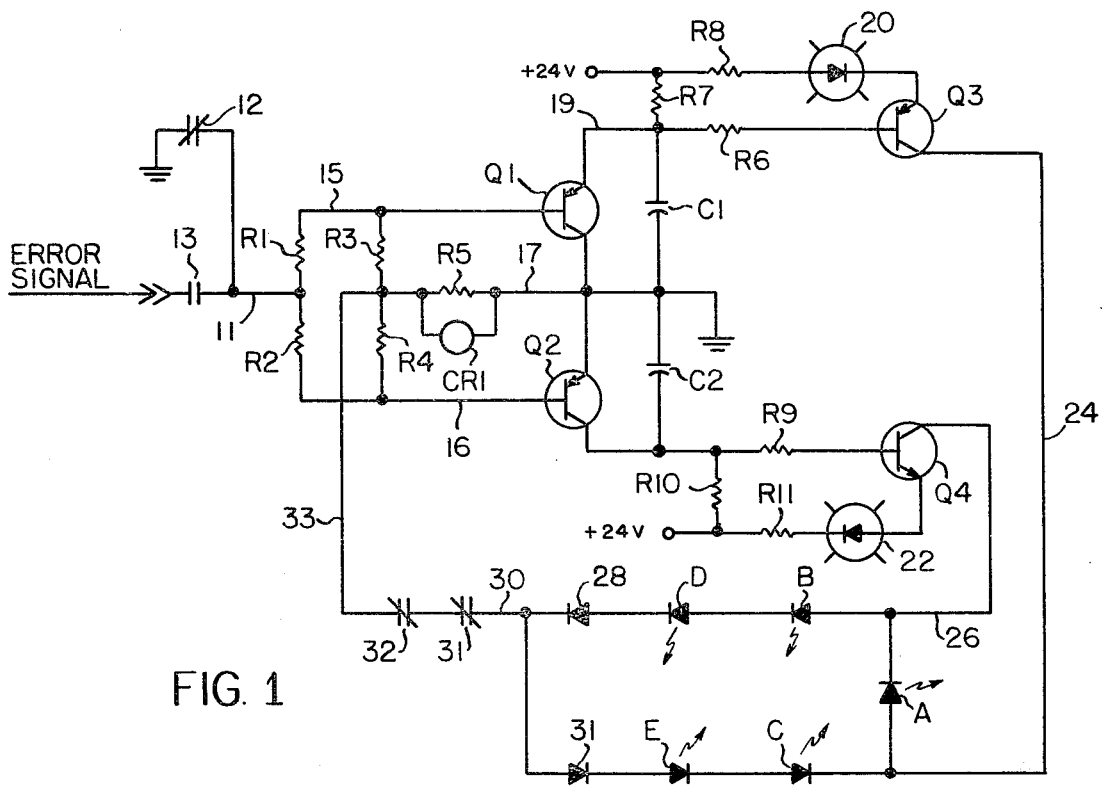
FIG. 1 is a wiring diagram illustrating an error signal amplifier circuit which selectively energizes the LED portions of a plurality of optical isolators that control the slow speed operation of the stacker elevator motor in upward and downward directions, respectively.

Referring now to the drawings by numerals of reference, and first to FIG. 1, 11 denotes a stacker error signal input line, which is connected through a normally closed switch 12 to ground when the associated stacker is between commands-i.e. is awaiting instructions from a programming console, or the like. However, when the associated stacker is in operation, and its elevator section is approaching a level at which it is to be stopped, the switch 12 will be open, and switch 13 will be closed to apply an error signal from a vertical servo amplifier (not illustrated) to line 11. For reasons noted hereinafter, when this error signal on line 11 has a negative value greater than 0.6 volts, the associated elevator motor will be energized to rotate slowly in a direction which causes the elevator to move downwardly; and conversely, when the error signal on line 11 has a positive value greater than 0.6 volts, the elevator motor will be rotated slowly in the opposite direction to cause the elevator to move in an upward direction.

Line 11 is connected at one side through a resistor R1 and line 15 with the base of a transistor Q1, and through a resistor R2 and a line 16 with the base of another transistor Q2. Two further resistors R3 and R4 are connected in series with each other between lines 15 and 16, and in parallel with resistors R1 and R2. The common ends of resistors R3 and R4 are connected through a resistor R5 to a grounded line 17, and through a relay coil CR1, which is connected in parallel with the resistor R5. The collector of transistor Q1 and the emitter Q2 are also connected to ground by line 17.

The emitter of Q1 is connected by a line 19 and a resistor R6 to the base of a third transistor Q3, the emitter of which is connected through an indicator lamp 20, which may be a light emitting diode, and a resistor R8 to a positive twenty-four volt power supply. The collector of the transistor Q2 is connected through a line 21 and a resistor R9 to the base of a transistor Q4, the emitter of which is connected through a lamp 22, which may be of the variety denoted above at 20, and a resistor R11 to a negative twenty-four volt power supply. Line 19 is connected through a capacitor C1 to the ground line 17 in parallel with the emitter-collector circuit of transistor Q1. A capacitor C2 is connected between line 21 and the ground line 17 in parallel with the emitter-collector circuit of transistor Q2. Normally a positive charge is maintained on capacitor C1 by the positive twenty-four volt power supply, which is connected through the resistor R7 and line 19 to capacitor C1. The negative twenty-four volt power supply is connected through a resistor R10 and line 21 to the capacitor C2 in order normally to maintain a negative charge on this capacitor.

The collector of Q3 is connected by a line 24 to the anode of the LED portion of an optical isolator A. The cathode of this LED is connected by a line 26 to the collector of the transistor Q4, and to the anode of the LED of an optical isolator B of which only the light emitting portion is illustrated in FIG. 1. The LED of isolator B is connected in series with the LED portion of another optical isolator D and a diode 28, the cathode of which is connected by a line 30, and through normally closed relay switches 31 and 32, and a line 33 to the common point between the resistors R3 and R4. Line 30 is also connected through three series connected diodes 31, E and C with the anode of the LED portion of the isolator A, to form a current path opposite to that formed by the diodes 28, D and B. Diode E and C are of the LED variety, and form the light-emitting portions of optical isolators E and C, respectively.

The above-described circuit provides two amplifier stages which are polarity sensitive in the sense that operation thereof will depend upon the polarity of the error signal applied to line 11. For example, assuming the error signal on line 11 is positive and exceeds 0.6 volt, Q1 will conduct so that the capacitor C1 discharges through the emitter-collector circuit of this transistor to ground. At this time, assuming that switches 31 and 32 are closed, a drop in voltage on the capacitor C1 fires the transistor Q3 so that current begins to flow from the positive 24 volt power supply through resistor R8, the lamp 20 to illuminate the latter, the emitter-collector circuit of Q3, line 24, diodes A, B, D and 28, line 30, switches 31 and 32, line 33 and in parallel through the resistor R5 and the relay coil CR1 to the ground line 17. As a result, the three diodes A, B, and D are caused to glow, whenever the error signal input is greater than a positive 0.6 volts.

Conversely, whenever the input signal on line 11 is greater than a negative 0.6 volts, the transistor Q2 is turned on, so that the capacitor C2 is discharged through the collector-emitter circuit of Q2 to ground, thereby triggering Q4 to its conductive mode. At this time, then, current flows from the ground line 17 through the relay CR1 and the resistor R5, line 33, switches 32, 33 line 30, diodes 31, E, C and A to line 26, and through the collector-emitter circuit of Q4, the lamp 22 and resistor R11 to the minus twenty-four volt power supply. For this type of error signal, therefore, the diodes E, C and A are illuminated to control the downward motion of the stacker elevator to a selective position.

Figure 2:
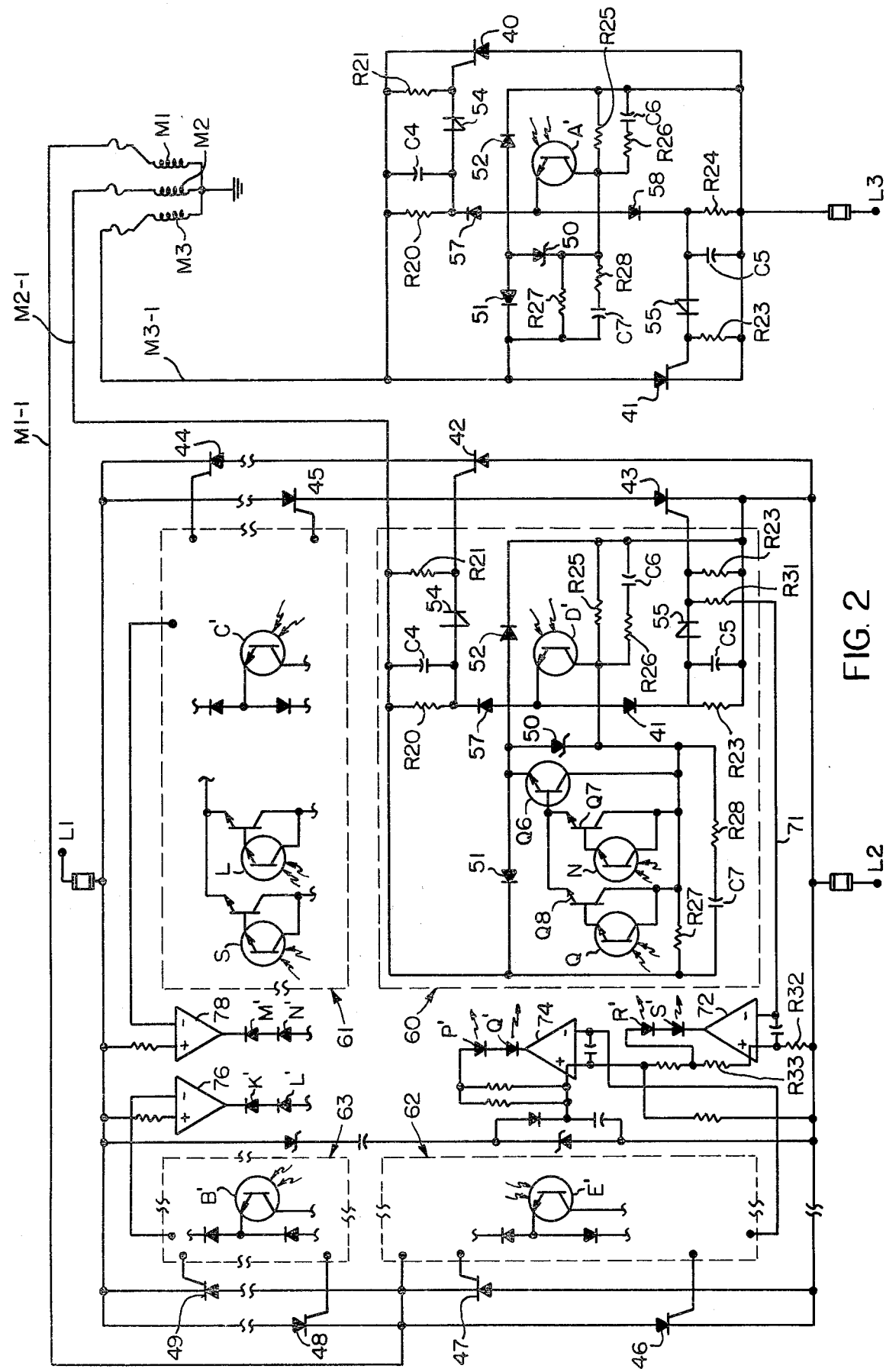
FIG. 2 is a wiring diagram illustrating the phototransistor portions of these optical isolators and the back-to-back SCR's in the motor circuit that are selectively controlled thereby.

Referring now to FIG. 2, the phototransistor stages of the optical isolators A, B, C, D and E are denoted at A', B', C', D' and E', respectively. In this Figure the three slow speed windings of the reversible, three phase motor which operates the stacker elevator are denoted at M1, M2 and M3, respectively. Winding M3 is the common winding which is selectively connected through line M3-1 to one line L3 of a three phase power source by a first pair of silicon controlled rectifiers or SCR's 40 and 41 which are connected in back-to-back relation between winding M3 and line L3. Winding M2 is selectively connected through line M2-1 to a second line L2 of the three phase power source by a second pair of SCR's 42 and 43, which are connected in back-to-back relation between M2 and L2; or, alternatively, the winding M2, depending upon the direction in which the motor is to be rotated, is selectively connected to the third line L1 of the three phase power source by a third pair of SCR's 44 and 45, which are connected in back-to-back relation between M2 and L1. The remaining motor winding M1 is selectively connected through line M1-1 to line L2 by a fourth pair of SCR's 46 and 47, which are connected in back-to-back relation between M1 and L2; or, again depending upon the direction in which the elevator motor is to be rotated, the winding M1 is connected selectively to the power line L1 through a fifth pair of SCR's 48 and 49, which are connected in back-to-back relation between the winding M1 and line L1.

From an examination of FIG. 2, it will be apparent that, regardless of the direction in which the elevator motor is to be rotated, the phototransistor A' must be energized to enable alternating current to flow between L3 and the common winding M3. In accordance with the above-described circuits shown in FIG. 1, a positive input error signal on line 11 drives the elevator upwardly by illuminating the LED sections of the isolators B and D, thereby triggering the phototransistor portions B' and D' of these isolators, as shown in FIG. 2, so that during upward movement of the elevator the SCR pairs 42, 43 and 48, 49 are selectively actuated. On the other hand, when the elevator is to be driven downwardly, a negative error input signal on the line 11 of the circuit shown in FIG. 1 illuminates the LED sections of the isolators C and E, so that their corresponding phototransistor sections C' and E' (FIG. 2) are energized selectively to control the operation of the SCR pairs 44, 45 and 46, 47 during motion of the elevator in a downward position.

The means for controlling the operation of the several pairs of SCR's shown in FIG. 2 are, in essence, the same for each pair, except that each of the controls for the circuits containing the phototransistors B', C', D' and E' include interlock circuits which, as noted in greater detail hereinafter prevent undesirable cross gating in the event that there is a rapid reversal in the polarity of the error signal applied to the input line 11 of the error signal amplifier.

Referring to the operation of the SCR's 40 and 41, their respective gates are adapted to be pulsed or triggered by charges which are stored in capacitors C4 and C5, respectively. Capacitor C4 is connected in parallel with resistors R20 and R21 across the gate and cathode of the SCR 40. Likewise, the capacitor C5 is connected in parallel with resistors R23 and R24 across the gate and cathode terminals of the SCR 41. The collector terminal of the phototransistor A' is connected to the line L3, through a rather large resistor R25, which is connected in parallel with a resistor 26 and capacitor C6. The collector terminal of A' is also connected to the winding M3 through another relatively high resistence R27, which is connected in parallel with a resistor R28 and capacitor C7. The collector terminal of A' is further connected through a Zener diode 50 with the anodes of two diodes 51 and 52, the former of which has its cathode connected to the winding M3 and the latter of which has its cathode connected to the line L3. The purpose of the Zener diode 50 is to limit the voltage across the phototransistor A' to approximately twelve volts so that anything greater than this value will be discharged through diode 51 or 52 to line M3 or L3, depending upon which happens to be at a negative potential at the time that the Zener diode 50 fires.

Connected between the capacitor C4 and the gate terminal of SCR 40 is a unilateral switch 54, which is set to fire or conduct when the charge on capacitor C4 reaches or exceeds approximately eight volts. A silicon unilateral switch 55 is connected between the capacitor C5 and the gate terminal of the SCR 41, so as to conduct and pulse this last-mentioned gating terminal whenever the charge on capacitor C5 reaches approximately eight volts.

Assuming that the LED for the optical isolator A is illuminated, the phototransistor section A' thereof will be in a conducting mode, so that current flow through the collector-emitter circuit of A' will be directed through a diode 57 and the capacitor C4 to the winding M3, or through a diode 58 and the capacitor C5 to line L3, depending upon whether the winding M3 or the line L3 is at a negative potential at that particular instance. Assuming, for instance, that the AC voltage on line L3 is swinging positive, current flow through the transistor A' will be directed through the diode 57 to the capacitor C4, so that as soon as the charge on this particular capacitor reaches eight volts, the switch 54 will conduct to apply a triggering pulse from the capacitor C4 to the gate of SCR 40, so that the latter conducts. Alternatively, when the AC voltage on line L3 swings negative, and the motor winding M3 begins to swing positive, the current flow through the transistor A' will be directed by the diode 58 to the capacitor C5, until the charge thereon reaches eight volts, at which times switch 55 will conduct to gate SCR 41, which then begins to conduct. It will be understood, of course, that the SCR's 40 and 41 conduct alternatively, the current flow through a respective SCR ceasing as soon as the AC signal applied to its anode begins to swing negative.

As noted above, the gating circuits for the five different pairs of SCR's shown in FIG. 2 are similar in construction and in operation, except for the fact that the four pairs of SCR's which are connected to the reversal windings M1 and M2 include inhibiting circuits which prevent cross gating upon reversal of the error signal. For this reason, in FIG. 2 only one gating circuit for each of the four remaining pairs of SCR's has been illustrated in detail in connection with the SCR's 42 and 43, and is denoted generally at 60. Also, because the portion of this circuit 60, which generates the gating signals for the SCR's 42 and 43 is substantially identical in construction and operation to the corresponding gating circuit for the SCR's 40 and 41, like numerals have been employed in the circuit 60 to denote elements that are similar in function and operation to those employed in the gating circuit for the SCR's 40 and 41.

As will be apparent from an examination of FIG. 2, the principal difference between circuit 60 and the gating circuit for the SCR's 40 and 41 is that a power transistor Q6 has its emitter-collector circuit connected across the associated Zener diode 50 in circuit 60. Consequently whenever the transistor Q6 is switched to its conducting mode it will shunt out of the diode 50 and will connect the collector terminal of the associated phototransistor D' directly to ground through the diode 51 or 52, depending upon whether at that particular moment the line L2 or the winding M2 happens to be at negative potential. Thus, whenever the transistor Q6 is conducting, the phototransistor D' will not be able to charge either of the associated storage capacitors C4 and C5, and consequently the gating of the SCR's 42 and 43 is inhibited.

To control the operation of the power transistor Q6, two additional transistors Q7 and Q8 are connected in parallel to each other between the base and collector of the power transistor Q6. To control the transistor Q7, the emitter-collector circuit of the phototransistor section of an optical isolator N is connected across the base and collector of Q7. Likewise, to control the transistor Q8, the emitter-collector circuit of the phototransistor section of another optical isolator Q is connected across the base and collector of Q8. When the phototransistors Q and N are illuminated by their hereinafter described LED's, transistors Q6, Q7, and Q8 are conducting so that the SCR's 42 and 43 are inhibited, or prevented from being switched to their conductive modes.

In FIG. 2, the numerals 61, 62 and 63 denote generally the three remaining gating circuits which respond to the phototransistors C', E' and B', respectively. Since each of these gating circuits is substantially similar in construction and operation to the circuit 60, they have not been illustrated in detail herein. It will be appreciated, however, that each of the circuits 61, 62 and 63 includes an inhibiting circuit including a pair of phototransistor sections and two optical isolators of the type noted, for example, at Q6 in FIG. 2. By way of example, a portion of the inhibiting circuit contained in the gating circuit 61 is shown in FIG. 2 to include the phototransistors S and L, the drivers for which will be described hereinafter.

Signals for operating the above-noted inhibiting circuits are derived by comparing the voltages that exist at any moment on the gating terminal and the cathode of each SCR shown in FIG. 2; and the outputs of these comparators are used to energize the LED's which form the drivers of the inhibiting circuits. For example, as shown in FIG. 2, the gate for the SCR 43 is connected through a resistor R31 and a line 71 to one of the two inputs (the negative input) of a conventional voltage comparator 72, which may be of the type known as Motorola MC3302P. The cathode of SCR 43, which in the illustrated embodiment is also connected to line L2, is connected through a resistor R32 to the other input of the comparator 72. The output of comparator 72 is connected to the cathode of an LED S' which is the driver for the phototransistor S that forms a portion of the gating circuit denoted generally at 61. The anode of S' is connected to the cathode of another LED which is denoted at R'; and the anode of this latter LED is connected through a resistor R33 to the positive input terminal of comparator 72. It is well known that whenever an SCR is carrying current, and only during such interval of time, the voltage that exists between the cathode and gate terminal of the SCR is the range 0.5 to 1.0 volts. Thus, whenever the SCR 43 is conducting, the output of the comparator 72 will cause the LED's R' and S' to conduct and glow.

In a similar manner, the cathode and gating terminal of the SCR 46 are connected to the inputs of a further comparator 74 so that when SCR 46 is conducting the output of this comparator will drive or illuminate the LED's denoted at P' and Q'. Also, the comparator 76 measures the voltage drop between the cathode and gate of the SCR 49 selectively to drive the LED's K' and L'; and the potential between the gate and cathode terminal of the SCR 44 is measured by the comparator 78, the output of which selectively drives the two LED's denoted at M' and N'. Thus, when the SCR 46 and the SCR 44 are conducting, the LED's denoted at N' and Q' will be illuminated, and consequently will drive the associated phototransistors Q and N in circuit 60 so that the power transistor Q6 is switched to its conducting mode, therefore blocking the operation of the SCR's 42 and 43. Likewise at this time the inhibiting circuits in the gating circuit 63 will also be operating to prevent or inhibit the operation of the SCR's 48 and 49. The inhibiting circuits in the gating circuit 60 and 63, therefore, will remain energized until such time that the voltage drop disappears from across the gate and cathode terminals of the SCR's 44 and 46, respectively.

Conversely, when the two pairs of SCR's 42, 43 and 48, 49 are conducting, the inhibiting circuits in the gating circuits 61 and 62 will prevent operation of the associated SCR pairs 44, 45 and 46, 47.

From the foregoing it will be apparent that the abovedescribed gating circuits provide novel means for rapidly and accurately controlling the operation of a reversible three phase motor of the type described. Still a further advantage of the above-noted control means is that the inhibiting circuits contained in the gating circuits prevent undesirable cross gating and consequent damage to the motor during its operation.

Experience with this drive has shown the desirability of the three phase system of the grounded neutral or four wire type, because $dv/dt$ turn-ons simultaneously of cross gating pairs can occur at surge conditions not associated with the control circuitry, and consequently with no chance to develop the inhibit control for either condition. An alternate safeguard is the inclusion of air core or saturable reaction in L1 and L2 of FIG. 2 which will limit the half cycle current to the extended current rating of the thyristors employed in the control. These reactors are included for control purposes in all three lines L1, L2, L3 of the modified control to be described in connection with FIGS. 3 and 4.

Figure 3:
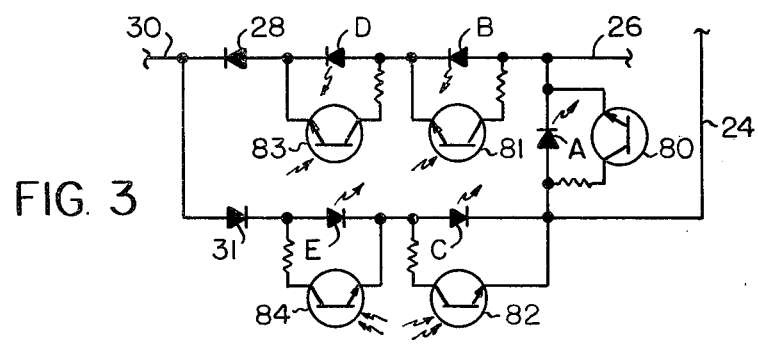
FIG. 3 is a wiring diagram showing a modification of the amplifier of FIG. 1 which is particularly suitable for achieving phase control of the vertical motor during slow speed switching thereof.
Figure 4:
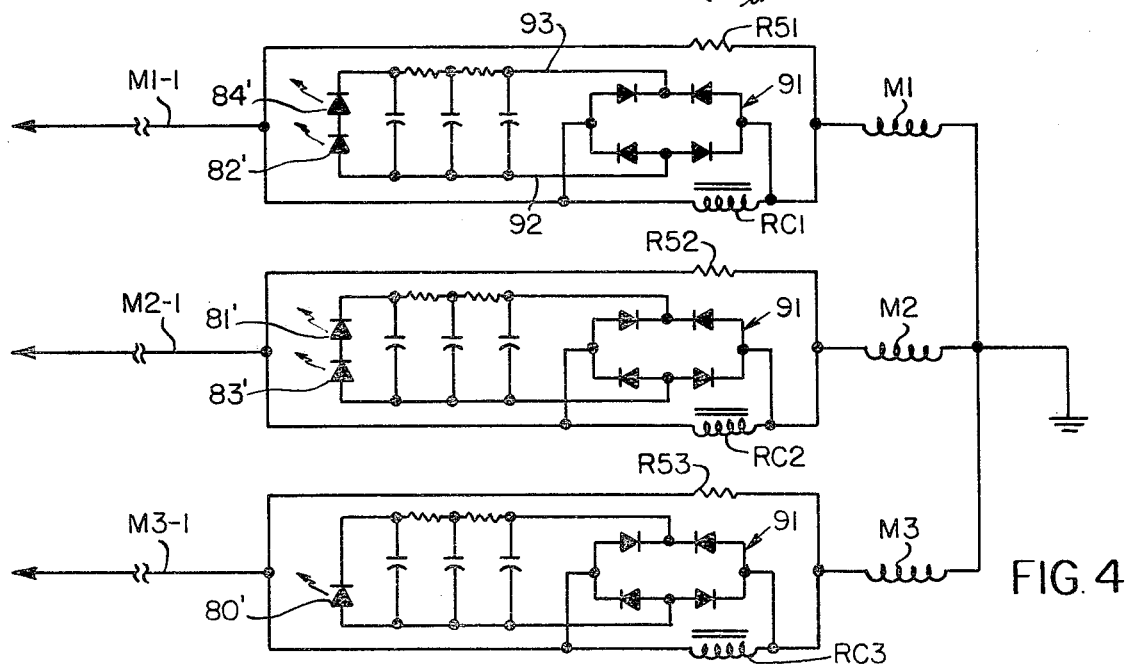
FIG. 4 is a wiring diagram showing how the circuit in FIG. 2 is modified to be controlled by the modified amplifier of FIG. 3.

Referring now to the embodiment illustrated in FIGS. 3 and 4, wherein like numerals are employed to denote elements similar to those employed in the first embodiment, FIG. 3 illustrates part of a modified amplifier circuit in which the phototransistor sections of each of five different optical isolators 80, 81, 82, 83 and 84 have their respective emitter-collector circuits connected in shunt across the LED's A, B, C, D and E, respectively. The lines 24, 26 and 30, as illustrated in FIG. 3, are to be connected in a manner similar to that illustrated in FIG. 1 to the remainder of the amplifier circuitry, which is identical to that shown in FIG. 1 except that, in the case of the amplifier of FIG. 3, the positive feedback resistors R3 and R4 are eliminated. Otherwise the amplifier circuit of FIG. 3 is similar to that shown in FIG. 1. Whenever one of the phototransistors of isolators 80, 81, 82, 83 or 84 is driven to its conducting mode, it effectively shunts out a portion of the current which otherwise would flow through the associated LED via lines 30, 26 or 24, 30.

Referring now to FIG. 4, it will be noted that the motor windings M1, M2, and M3 are connected to their associated lines M1-1, M2-1 and M3-1 by reactor coils RC1, RC2 and RC3, respectively, and by resistors R51, R52 and R53, which are connected in parallel with the reactors RC1, RC2 and RC3, respectively. A conventional rectifier circuit, only one of which is denoted in detail at 91 in FIG. 4, is connected across each of these reactors RC1, RC2 and RC3.

The output of the rectifier circuit 91 across the reactor RC1, is applied by lines 92 and 93 to a pair of series connected LED's 82' and 84', which form the drivers for the phototransistor sections of the optical isolators 82 and 84, respectively (FIG. 3). Interposed between the lines 92 and 93 is a conventional RC filtering circuit which will not be described in detail herein. Regardless of the direction of the current flow through winding M1 and the reactor RC1, the associated rectifier circuit 91 will supply current to the series connected LED's 82' and 84' which, when energized, will swing the corresponding phototransistor sections of the isolators 82 and 84 to their conductive modes, thereby to shunt from the LED's E and C at least portions of the current which would otherwise flow therethrough during the time when the elevator section of the associated stacker is being driven downwardly by its motor.

In a like manner, the rectifier circuit 91 which is connected across the reactor RC2 supplies current to a pair of LED's 83' and 81' (FIG. 4), which constitute the drivers for the phototransistor sections of the isolators 83 and 81, respectively (FIG. 3). Consequently, whenever current is flowing in the motor winding M2, the rectifier circuit associated with RC2 supplies current to the drivers 83' and 81' for the phototransistor sections of optical isolators 83 and 81, which in turn conduct and shunt at least a portion of the current which otherwise would flow through the LED's B and D during the travel of the elevator in its upward direction.

In a similar manner, whenever current flows in the reactor RC3 and motor winding M3, the rectifier circuit 91 associated with RC3 will supply current for the LED 80' (FIG. 4). This diode is the driver for the phototransistor section of the optical isolator 80 (FIG. 3), which selectively shunts current which would otherwise flow through the LED denoted at A.

From the foregoing it will be apparent that applicant has developed a relatively simple and inexpensive means for achieving phase control of the SCR's of an induction motor drive to the type described, thereby to produce reduced motor torqe, and therefore better to control the speed of operation. Phase control is easily achieved in this particular case through the use of optical isolators, which provide a very simple and accurate means for exercising the desired phase control.

While this invention has been illustrated and described in detail in connection with only two embodiments, thereof, it will be apparent that this application is intended to cover any such modifications which fall within the scope of one skilled in the art or the appended claims.

Having thus described my invention what I claim is:

1. Servo apparatus for controlling the direction of rotation of a reversible, polyphase motor, comprising
    a first circuit for sensing the polarity of an error signal produced during operation of said motor,
    means in said first circuit for producing a first plurality of signals, when said error signal is of one polarity, and for producing a second plurality of signals when said error signal is of the opposite polarity,
    a second circuit having a plurality of thyristors between the lines of an AC polyphase power supply and the windings of said polyphase motor,
    control means in said second circuit for selectively switching said thyristors between conducting and non-conducting modes, respectively, thereby to control the direction of rotation of said motor, said control means including a first series of control elements operatively coupled to said first circuit and responsive to said first plurality of signals to switch certain of said thyristors to their conducting modes to effect rotation of said motor in one direction, a second series of control elements operatively coupled to said first circuit and responsive to said second plurality of signals to switch others of said thyristors to their conducting modes to effect rotation of said motor in the opposite direction, and inhibiting means connected between said first and second series of elements, and the switching thyristors controlled thereby, and responsive directly to the voltage drop across the gate and cathode terminals, respectively, of said thyristors, and indirectly to current flow in said thyristors, to prevent conduction of said certain thyristors when said other thyristors are conducting, and vice versa.

2. Servo apparatus for controlling the direction of rotation of a reversible, polyphase motor, comprising a first circuit for sensing the polarity of an error signal produced during operation of said motor, means in said first circuit for producing a first plurality of signals, when said error signal is of one polarity, and for producing a second plurality of signals when said error signal is of the opposite polarity, a second circuit having a plurality of solid state switching devices connected between the lines of an AC polyphase power supply and the windings of said polyphase motor, control means in said second circuit for selectively switching said devices between conducting and non-conducting modes, respectively, thereby to control the direction of rotation of said motor, said control means including a first series of control elements operatively coupled to said first circuit and responsive to said first plurality of signals to switch certain of solid state devices to their conducting modes to effect rotation of said motor in one direction, a second series of control elements operatively coupled to said first circuit and responsive to said second plurality of signals to switch others of said devices to their conducting modes to effect rotation of said motor in the opposite direction, and inhibiting means connected between said first and second series of control elements, and the switching devices controlled thereby and responsive to current flow in said devices, and independently of said first and second pluralities of signals, to prevent conduction of said certain devices when said other devices are conducting, and vice versa, said signal producing means comprising first and second sets of light-emitting diodes connected in said first circuit to produce upon illumination thereof said first and second pluralities of signals, respectively, and said first and second series of elements in said second circuit comprising, respectively, first and second sets of phototransistors disposed to be controlled by illumination from said first and second sets, respectively, of said diodes.

3. Servo apparatus as defined in claim 2, wherein said inhibiting means comprises a first plurality of signal generators connected to said certain devices and operative to generate a first series of inhibiting signals when said certain devices are conducting, a second plurality of signal generators connected to said other devices and operative to generate a second series of inhibiting signals when said other devices are conducting, and means for applying said first and second series of inhibiting signals to said second and to said first sets, respectively, of said transistors selectively to prohibit conduction thereof independent of the signals received by said transistors from the associated diodes in said first circuit.

4. Servo apparatus as defined in claim 3, including means optically coupling the outputs of said signal generators to said first and second sets of transistors to effect control of the latter in response to said generator outputs.

5. Servo apparatus as defined in claim 2, including a reactor coil connected in series with each of said windings, means for sensing changes in the current flow through each of said reactor coils, and means connecting each of the last-named sensing means to one of said sets of diodes in said first circuit to limit the flow of current through said one set of diodes in proportion to the current flow detected through the associated reactor coil.

6. Servo apparatus as defined in claim 3, wherein each of said devices comprises a pair of thyristors connected in parallel, opposed relation between one of said power lines and one of said motor windings, at least one of the thyristors of each device has its gating terminal connected to one of said signal generators, and each of the thyristors of each device has its gating terminal connected to one of said transistors selectively to be triggered thereby.

7. Servo apparatus as defined in claim 6, wherein said inhibiting means further comprises a power transistor connected in shunt with each of the phototransistors of said first and second sets thereof, means connecting each of said power transistors associated with said first set of phototransistors with said second plurality of signal generators to be switched thereby to a conducting mode when said other devices are conducting, and means connecting each of the power transistors associated with said second set of phototransistors with said first plurality of signal generators to be switched thereby to a conducting mode when said certain devices are conducting.

8. Servo apparatus for controlling the direction of rotation of a reversible, polyphase motor, comprising a first circuit for sensing the polarity of an error signal produced during operation of said motor, means in said first circuit for producing a first plurality of signals, when said error signal is of one polarity, and for producing a second plurality of signals when said error signal is of the opposite polarity, a second circuit having a plurality of solid state switching devices connected between the lines of an AC polyphase power supply and the windings of said polyphase motor, control means in said second circuit for selectively switching said devices between conducting and non-conducting modes, respectively, thereby to control the direction of rotation of said motor, said control means including a first series of control elements operatively coupled to said first circuit and responsive to said first plurality of signals to switch certain of solid state devices to their conducting modes to effect rotation of said motor in one direction, a second series of control elements operatively coupled to said first circuit and responsive to said second plurality of signals to switch others of said devices to their conducting modes to effect rotation of said motor in the opposite direction, and inhibiting means connected between said first and second series of control elements, and the switching devices controlled thereby and responsive to current flow in said devices, and independently of said first and second pluralities of signals, to prevent conduction of said certain devices when said other devices are conducting, and vice versa, said means in said first circuit for producing said first and second pluralities of signals comprising first and second sets, respectively, of light emitting diodes optically coupled to said first and second series of elements, respectively, in said second circuit, and including means connected to each of said diodes and responsive to changes in current flow in said motor windings to limit the amount of current flow through said diodes.

9. Servo apparatus as defined in claim 8, wherein said current limiting means comprises
   a phototransistor connected in shunt across each of said diodes, and
   a further plurality of light-emitting diodes connected to said motor windings and operative in response to predetermined changes in the flow of current in said windings selectively to be illuminated to trigger their associated phototransistors in said first circuit.

10. Servo apparatus as defined in claim 6, wherein the collector terminal of each of said phototransistors is connected through a zener diode selectively to a motor winding or to one of said power lines to limit the voltage drop across each of said transistors.

* * * * *